United States Patent [19]

Yoshida

[11] 4,328,878
[45] May 11, 1982

[54] MOUNT FOR STEERING SKIS FOR SNOWMOBILES

[75] Inventor: Keisuke Yoshida, Cypress, Calif.

[73] Assignee: Yamaha Hatsudoki Kabushiki Kaisha, Iwata, Japan

[21] Appl. No.: 75,139

[22] Filed: Sep. 12, 1979

[30] Foreign Application Priority Data

Sep. 29, 1978 [JP] Japan .................................. 53-120620
Nov. 30, 1978 [JP] Japan .................................. 53-148508

[51] Int. Cl.³ ...................... B62B 13/10; B62M 27/00
[52] U.S. Cl. ...................................... 180/182; 280/16; 280/21 R
[58] Field of Search ................ 180/182, 183, 190–195; 280/16, 21 R, 25, 26, 276

[56] References Cited

U.S. PATENT DOCUMENTS

| 2,925,873 | 2/1960 | LaPorte | 180/193 |
| 3,613,809 | 10/1971 | Chaumont | 180/182 |
| 3,693,992 | 9/1972 | Piedboeuf | 180/182 |
| 3,977,485 | 8/1976 | West | 180/190 |
| 4,147,371 | 4/1979 | Morita et al. | 280/276 |

Primary Examiner—Joseph F. Peters, Jr.
Assistant Examiner—Donn McGiehan
Attorney, Agent, or Firm—Donald D. Mon

[57] ABSTRACT

A mount for pivotally joining the steering ski of a snowmobile to an extendible-retractible movable tube of a strut-type suspension. The joinder is made by a pivot pin which extends laterally to, and is offset from, the movable tube. Preferably the tube is disposed at an angle to the vertical, and the pivot pin is behind the movable tube. The ski and pivot pin can be removably mounted to the end of the movable tube by a gusset which itself can be attached to and removed from, the movable tube.

5 Claims, 5 Drawing Figures

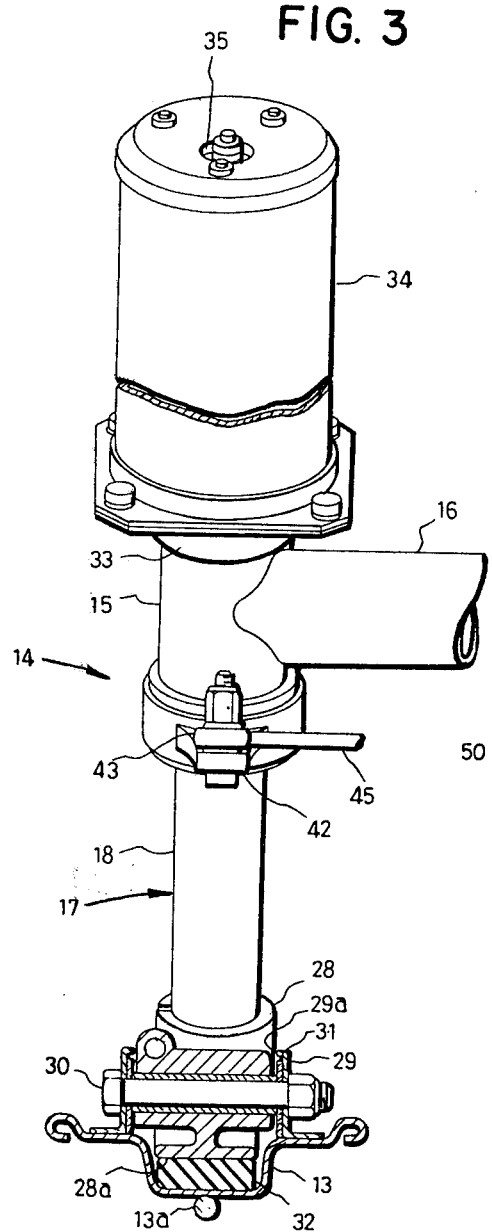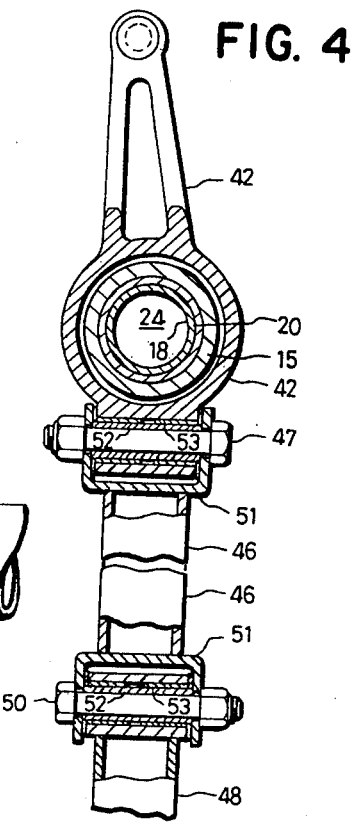

MOUNT FOR STEERING SKIS FOR SNOWMOBILES

FIELD OF THE INVENTION

This invention relates to snowmobiles, and especially to a mount for attaching a steering ski to a strut-type suspension assembly.

BACKGROUND OF THE INVENTION

In order to provide increased rideability and stability for a snowmobile, strut-type suspension assemblies for the steering ski or skis are meeting with increased favor, and are supplanting the older leaf-spring type suspensions. A strut-type suspension assembly includes a stationary member which is fixed to the chassis of a snowmobile, and a movable tube which is slidable relative to the stationary tube. A steering ski is connected pivotally to the lower end of the movable tube by means of a pivot pin which is arranged transversely with respect to the running direction. The movable tube is biased to return downwardly in order to perform its suspension function. It has been customary practice to mount the pivot pin directly on, and transverse to, the axis of the movable tube.

A strut-type steering ski suspension assembly resists sway and lateral deflection during cornering better than the leaf-spring type of suspension. However, it does have the draw-back that its overall height is greater. This results from the fact that in order to provide sufficient stability and strength, the stationary tube must have a considerable length. Also, the movable tube must be long enough to provide for the cushioning stroke.

As known suspension assemblies become more elongated, they must protrude additionally from the chassis cowling. This cowling is generally rounded for best appearance and performance. The protrusions adversely affect the appearance.

Especially when the snowmobile is equipped with a pair of steering skis, there is the further draw-back that the suspension assembly must protrude considerably from the cowling while still leaving the spacing between skis (i.e. the tread) unchanged, or the tread must be narrowed to such an extent as to sacrifice driving stability. Because the steering ski or skis are attached to the movable tube of a strut by means of a pivot pin which is located just below the movable tube, the total height in conventional installations is enlarged to the extent necessary to accommodate this pivot pin. This accommodation is made either by causing a larger protrusion from the cowling or by shortening the cushioning stroke, both of which are undesirable expedients.

It is an object of this invention to increase the effective cushioning stroke of the suspension assembly without increasing its height, and thereby to minimize or even to eliminate the protrusion of the system from the cowling for the same stroke.

It is another object of the invention to improve the stability of the vehicle, by placing the mounting pin of the ski rearwardly of the strut so it stably follows the strut, somewhat similar to the action of a caster.

Yet another object of the invention is to provide a improved mounting of the ski to the movable tube such that the ski can readily be removed and replaced without removing or replacing the movable tube, and so that the offset of the ski mounting pin can be changed merely by substitution with a modified mounting.

BRIEF DESCRIPTION OF THE INVENTION

According to this invention, a strut-type suspension assembly includes a movable tube at the bottom of which there is a pivot pin that is offset from the axis of the movable tube where it is attached to it, at an axial location within the axial extent of the movable tube. Thus, the pivot pin need not project beyond the end of the movable tube, and the total assembly is shortened.

According to a preferred but optional feature of the invention, the pivot pin is disposed rearwardly of the movable tube.

According to yet another preferred but optional feature of the invention, the pivot pin and ski are mounted to the movable tube by means of a gusset which can be removed from the end of the movable tube without removing, or making any change or alteration to the very expensive movable tube itself. Furthermore, the offset of the pivot pin from the axis can be changed by using a suitably modified gusset.

The above and other features of this invention will be fully understood from the following detailed description and the accompanying drawings, in which:

BRIEF DESCRIPTION OF THE DRAWINGS

FIGS. 3 and 4 are views partly in cutaway cross-section taken at lines 3—3 and 4—4 in FIG. 2.

DETAILED DESCRIPTION OF THE INVENTION

Figure 1:
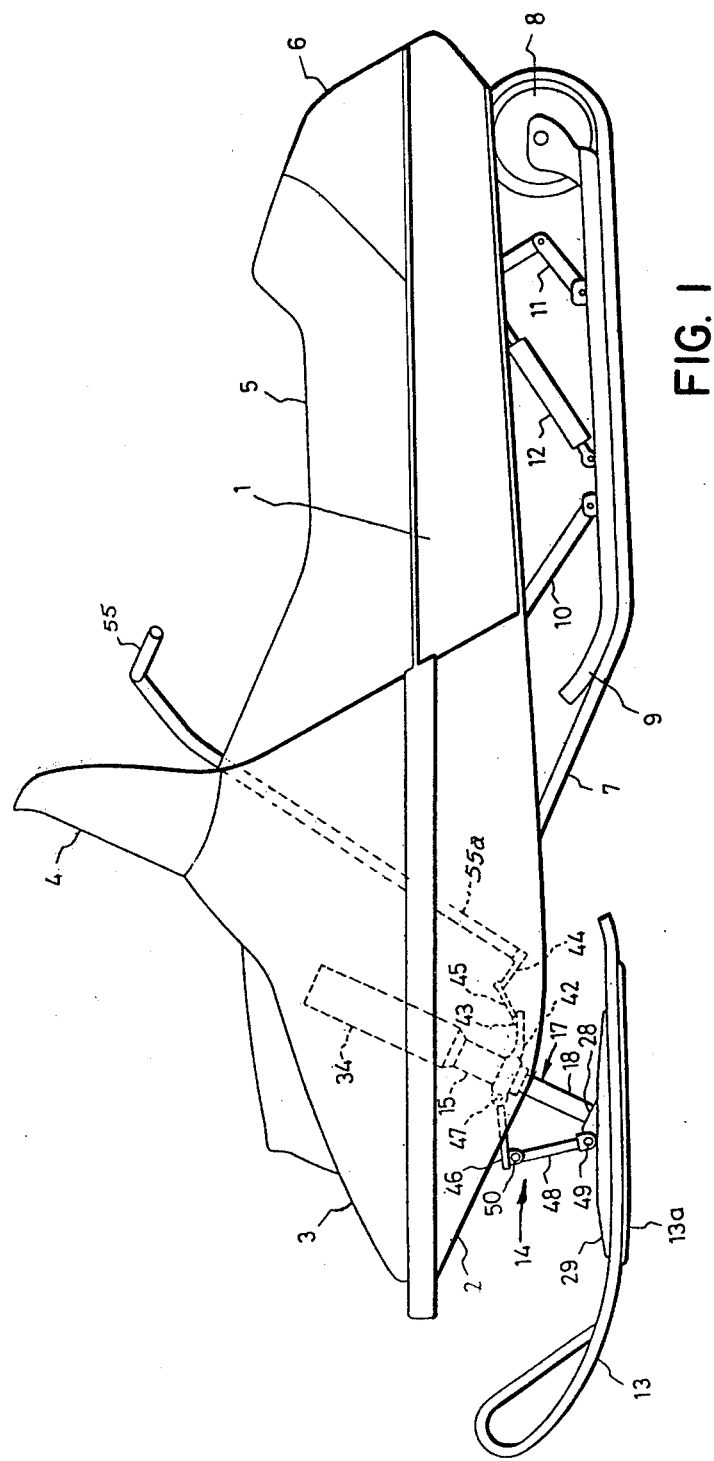
FIG. 1 is a side elevation of a snowmobile incorporating the invention.

In FIG. 1, reference numerals 1, 2 and 3 indicate a chassis, a bottom cover covering the lower front of the chassis 1, and a shroud covering the upper front of the chassis 1, respectively. A windshield 4, a driver's seat 5, a luggage box 6, a pair of endless tracks 7 (which will be shortly referred to as tracks), a pair of guide wheels 8 tensioning the tracks 7 backward, and a pair of slide rails 9 are connected to the chassis. Each of slide rails 9 is arranged to contact with the inner side of the corresponding track 7, and is mounted to the aforementioned chassis 1 through links 10 and 11, a shock absorber 12 and a spring (not shown) in such a manner that the track 7 will be elastically held. The front end of track 7 runs on a sprocket wheel (not shown) so that the driving force of a prime mover is transmitted thereto through a centrifugal type stepless reduction gear mechanism and the sprocket wheel.

A pair of steering skis 13 are arranged below bottom cover 2. These steering skis 13 are suspended vertically elastically by means of a suspension assembly 14, which will be described in detail later, and are steered to the right and left at a varying steering angle by means of steering handlebars 55. A metal runner 13a is secured to the sliding surface of each of the skis 13.

Figure 2:
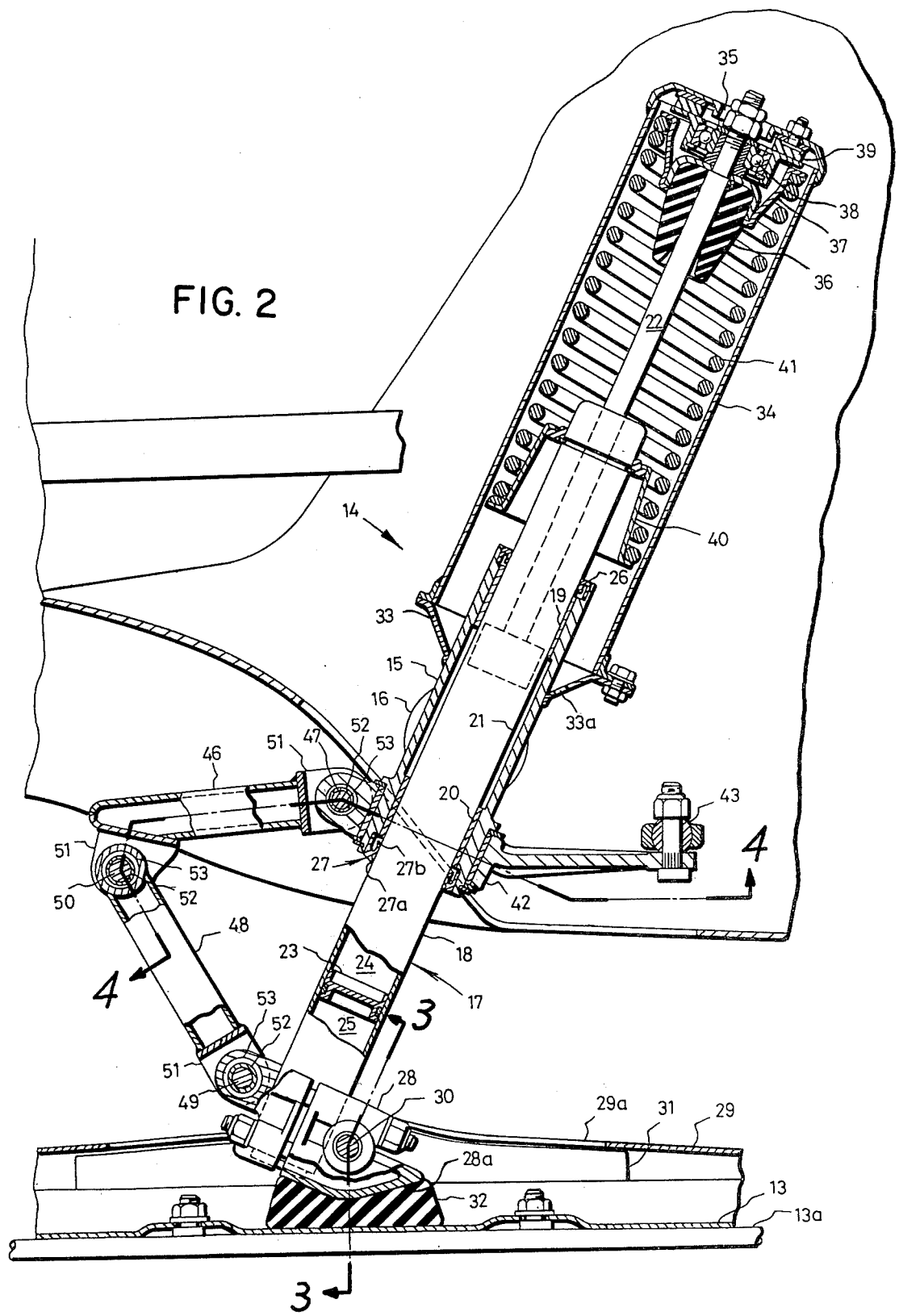
FIG. 2 is a side elevation, partly in axial cutaway cross-section, showing the presently preferred embodiment of the invention.

Suspension assembly 14 is held, as best seen in FIG. 2 and 3, in a stationary cylinder 15 (sometimes called a "fixed tube") which is fixed to the front extension of the aforementioned chassis 1. More specifically, the stationary cylinder 15 is fixed, while having its center axis slightly inclined backward, to both ends of a member 16 which extends transversely, and constitutes a portion of chassis 1. A strut or hydraulic shock absorber 17 is received in the stationary cylinder thus constructed That is to say, in the embodiment being described, the strut adapted to slide within the stationary cylinder 15 is made capable of acting as the shock absorber 17. Cylinder 18 (sometimes called a "movable tube" or "plunger" is embraced, aligned, and laterally restrained by means of a pair of upper and lower bearings 19, 20 so that the cylinder 18 can rotate and move up and down. It is directed downwardly and forwardly relative to the chassis. The space which is defined by the inner wall of the stationary cylinder 15 and the outer wall of the cylinder 18 between bearings 19 and 20 forms a grease chamber 21.

Shock absorber 17 is of the pneumatic type, with its piston rod 22 protruding upward. As a result, a slidable and axially unrestrained free piston 23 within cylinder 18 is located at a lower position of the shock absorber 17, and a pre-pressurizing gas chamber 25, isolated from an oil chamber 24 by the free piston 23 is located at the lower end of the movable tube. Prepressurizing gas chamber 25 is charged with nitrogen gas under high pressure (e.g., 15 to 25 kg/cm$^2$) so that the increase in the volume of the oil chamber 24 accompanying the entry of the piston rod 22 into the cylinder 18 is compensated by the movement of the free piston 23 and so that a preload in the extending direction is imparted to the piston rod 22. The lowered end of cylinder 18 is reduced to a joint for a bracket 28 (sometimes called a "gusset"), and its lowermost end face is formed with a port for filling gas into gas chamber 25.

In the upper end of the stationary cylinder 15, there is mounted a seal member 26 for sealing the gap between cylinders (tubes) 15 and 18. Another seal member 27 for sealing this gap is mounted in the lower end of the stationary cylinder 15. Seal member 27 comprises a downwardly extending lip 27a for repelling ice and an upwardly extending lip 27b acting as an oil seal. Since that portion of the cylinder, which is located below the stationary cylinder 15, is exposed to the outside, that portion will be attacked by snow or ice especially during parking. As has been mentioned above, seal member 27 is formed with the ice repelling lip 27a in addition to the oil sealing lip 27b so that oil sealing lip 27b is protected from damage by ice, thereby to increase the durability of the seal member 27. Since, however, cylinder 18 has its pre-pressurizing gas chamber 25 located at a low position where it will be exposed to the outside, the cooling effects obtainable are excellent. More specifically, the temperature of the shock absorber 17 is raised during the running operation of the snowmobile. As a result of this temperature rise, the nitrogen gas expands more than oil because of its higher coefficient of cubic expansion. By cooling the gas chamber 25 variation in the preload to be imparted to the piston rod 22 due to temperature variation is minimized.

Also, the portion of the movable tube below the fixed tube that contains oil is cooled. This reduces viscosity variations caused by variations in temperature, and tends to stabilize the dampening operation of the shock absorber.

Skis 13 are pivotally (tiltably) connected to the lower end of cylinder 18. More specifically, a bracket (gusset) 28 is fixed to the lower end of cylinder 18. A cover 29 having a generally dome-shaped section is secured to the ski 13. Thus, bracket 28 is pivotally supported by means of a pivot pin 30 such that it is located within the opening 29a which is formed in the cover 29. Incidentally, there is interposed between cover 29 and bracket 28 a reinforcement 31 which is secured to the inner side of the cover 29. On the other hand, bracket 28 has its lower side 28a bulging downward, and a resilient member 32 (Sometimes called a "cushion") is sandwiched between the bulging lower side 28a and the ski 13. As a result, the ski 13 is biased to return to its horizontal position.

There is secured to the outer circumference of the aforementioned stationary cylinder 15 a flange 33 which has an upwardly diverging and generally funnel-shaped cross-section. This flange 33 is jointed to the open end of a cylinder 34. The flange 33 is formed with a drain hole 33a for an air vent and drain port. On the other hand, cylinder 34 has at the center of its upper end face an opening 35 therethrough, which faces the upper end of piston rod 22. A bearing 38 has its inner race fixed to the upper end portion of piston rod 22. A stopper 36 (buffer) made of a resilient material and a spring seat 37 and its outer race are jointed to the upper end face of spring 41 through an annular elastic member 39 which is shrink-fitted therein. As a result, the piston rod 22 is held to the chassis 1. Thanks to the interposition of the elastic member 39, the possible misalignment between the bearings 19 and 20 and the piston rod 22 due to the vertically telescopic movements of the cylinder 18 can be compensated. Member 34 permits limited lateral shear-like movement between the upper end face of cylinder 34 and the upper end of the piston rod. A spring seat 40 is held on the upper portion of cylinder 18 so that a coiled compression spring 41 is retained in compression between spring seat 40 and the other spring seat 37 at the side of the piston rod 22. Since, in that way, the piston rod 22 is held to chassis 1, it follows that the compression spring 41 is retained between the cylinder 18 and a portion of chassis 1.

Reference numeral 42 indicates a steering arm with a collar which is mounted rotatably on the outer circumference of the lower portion of fixed tube 15. Steering arm 42 has a portion extending rearwardly, and which carries a ball joint 43. Reverting to FIG. 1, a pitman arm 44 is fixed to the lower end of the handle column 55a of the handle 55 and has its rotatable end connected to the ball joint 43 of the steering arm 42 by means of a tie rod 45.

A link 46 is connected pivotally to the front side of the arm 42 (and to its collar) by means of a pivot pin 47, which is arranged at a right angle with respect to the center axis of shock absorber 17, and substantially in parallel with the pivot pin 30 of the aforementioned ski 13. Another link 48 is connected pivotally to the front side of bracket 28, which is mounted on the lower end of the movable tube 18 (or plunger), by means of a pivot pin 49. Those two links 46 and 48 are connected pivotally to each other by means of still another pivot pin 50. These pivot pins 49 and 50 are arranged in parallel with the aforementioned pivot pin 47, and all are perpendicular to a plane which includes the forward axis of the ski and the central axis of the movable tube (plunger). The connecting portions of pivot pins 47, 49 and 50 are made to have the construction shown in FIG. 4. Although the connecting portion of pivot pin 49 is not shown in FIG. 4, it has a construction similar to those of the other pivot pins. Incidentally, reference numerals 52 and 53 indicate a collar and a metal bearing, respectively.

In operation, when the aforementioned steering handlebars 55 are turned, the steering arm 42 is turned through a pitman arm 44, the tie rod 45 and the ball joint 43. Since the links 46 and 48 are connected to the front side of the steering arm 42 by means of the pivot pins 47 and 50 which are arranged at a right angle with respect to the shock absorber 17, the links are going to rotate. On the other hand, since the aforementioned cylinder 18 and the piston rod 22 are held rotatably in the stationary cylinder 15 and the bearing 38, respectively, not only the bracket 28 at the lower end of the cylinder 18 but also the ski 13 are turned, together with the movable tube. Since, moreover, the aforementioned link 48 is pivotally connected at its lower end to the bracket 28 by means of the pivot pin 49 which is in parallel with the pivot pins 47 and 50, the steering arm 42 and the ski 13 turn together.

On the other hand, since the cylinder 18 of the shock absorber 17 is held telescopically in the stationary cylinder 15 such that its upper end portion is supported elastically by the compression spring 41, the ski 13 can move up and down along the center axis of the shock absorber 17 together with cylinder 18. At this time, the spacing between the steering arm 42 and the bracket 28 is so changed that the pivot pins of the links 46 and 48 accordingly rotate. Since, in this instance, the pivot pins 47, 49 and 50 are arranged to intersect the center axis of the shock absorber 17 at a right angle, the links 46 and 48 move in the plane extending through that center line (i.e., the plane in parallel to the surface of the sheet printed with FIG. 4) so that the steering angle of the ski 13 can be prevented from varying even if the ski 13 moves up and down.

Figure 5:
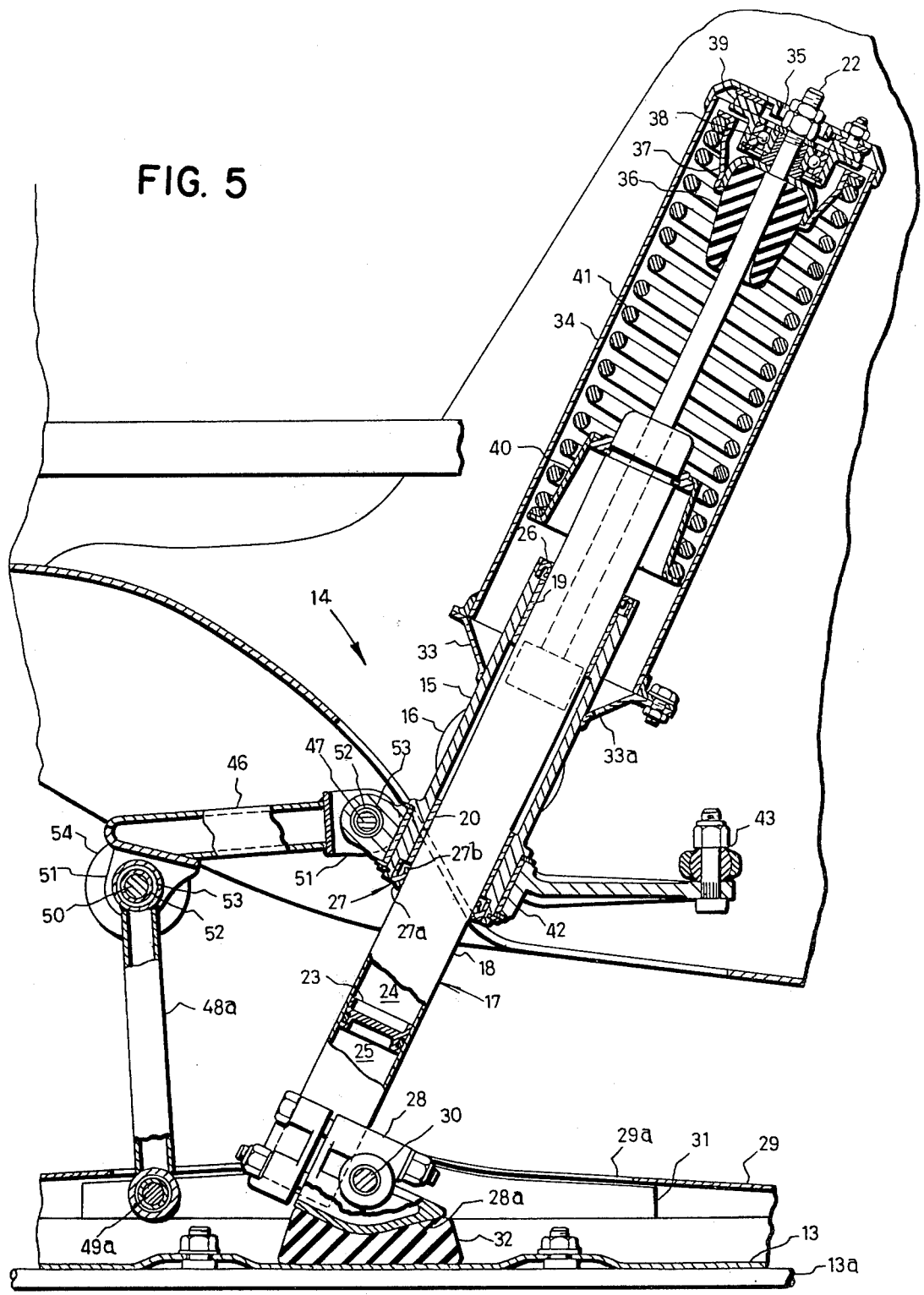
FIG. 5 is a fragmentary view of another embodiment of the invention.

FIG. 5 is a partially sectional side elevation showing another embodiment of the present invention. In FIG. 5, the same parts and portions as those appearing in FIG. 2 are indicated by the same reference numerals, and as such repeated explanations will be omitted here. In the second embodiment, the lower link 48a of the links for transmitting the rotations of the steering arm 42 is made to have its lower end pivotally connected directly to the ski 13, and a solid friction type shock absorber 54 is mounted on the pivot pin 50, at which the link 46 and 48 are pivotally connected. More specifically, the shock absorber 54 is composed of two friction pads which are forced into contact with each other. One of the friction pads is retained at the side of the link 46 whereas the other is retained at the side of the link 48a. The lower end of the link 48a is mounted pivotally through reinforcement 31 by means of a pivot pin 49a in the opening 29a which is formed in the aforementioned cover 29 of the ski 13.

As a result, in case the ski 13 rocks about the pivot pin 30 while running on a rough surface of snow, the angle between the links 48a and 46 is accordingly varied, but the rocking motions of the ski 13 are promptly absorbed by the friction between the two friction pads of the shock absorber 54.

Since the second embodiment has its shock absorber 54 mounted on the pivot pin 50, at which the links 46 and 48a are connected, its construction can be made simple and compact in comparison with the prior art, in which a cylindrical shock absorber is mounted.

As has been described, in a snowmobile equipped with a strut type steering ski suspension assembly according to the present invention, both the fixed tube holding the strut, and the steering arm made coactive with the steering handlebars, are pivotally supported on the center axis of the strut, and the links connecting the steering arm and the steering ski are arranged in front of the strut. As a result, those links are arranged in front of the exposed portions of the movable tube below the strut so that these exposed portions can be prevented from colliding against an obstacle, if any, which comes out of the snow surface while the snowmobile is running. The exposed portions of the movable tube are thereby protected from being damaged. This ensures smooth relative movements between the stationary cylinder and the strut thereby to extend the lifetime of the suspension assembly although those exposed portions not only move into and out of the stationary cylinder, but also rotate in the same. Since, moreover, the links always face in the running direction of the snowmobile, the sliding surface of the strut is always protected.

This invention is not to be limited by the embodiments shown in the drawings and described in the description, which are given by way of example and not of limitation, but only in accordance with the scope of the appended claims.

I claim:

1. In a strut-type suspension assembly for the steering ski of a vehicle to be operated on a snowy surface, said vehicle having an axis of forward motion, wherein an axially reciprocable strut plunger with an axis extends downwardly and with a component of direction forwardly from a chassis toward a ski, mounting means for mounting said ski to said plunger, comprising: pivot means having an axis of rotation normal to a vertical plane which is parallel to said axis of forward motion, and permitting tilting of said ski around said axis of rotation, said pivot means being rearwardly offset from said plunger axis.

2. Apparatus according to claim 1 in which said plunger has an outer wall, and in which said pivot means comprises a pivot pin rearwardly spaced from said outer wall.

3. Apparatus according to claim 2 in which said pivot pin is axially spaced from the end of the plunger nearest to said ski.

4. Apparatus according to claim 1 in which a gusset is removably attached to said plunger near the lower end of said plunger, and in which said pivot means is a pivot pin supported by said gusset, said gusset being adapted to receive said ski, and thereby tiltably to mount said ski to said plunger through said pivot pin.

5. Apparatus according to claim 4 in which said gusset extends a substantial rearward distance from said plunger to form a cushioning arm, and in which a deformable cushion is disposed between said cushioning arm and said ski to cushion abrupt tilting movements of said ski as a consequence of compression of said cushion by said cushioning arm.

* * * * *